(12) United States Patent
Zhao et al.

(10) Patent No.: US 12,050,883 B2
(45) Date of Patent: Jul. 30, 2024

(54) INTERACTION INFORMATION PROCESSING METHOD AND APPARATUS, DEVICE, AND MEDIUM

(71) Applicant: BEIJING BYTEDANCE NETWORK TECHNOLOGY CO., LTD., Beijing (CN)

(72) Inventors: Li Zhao, Beijing (CN); Kojung Chen, Beijing (CN); Jingsheng Yang, Beijing (CN); Tianshi Miao, Beijing (CN); Wenming Xu, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 0 days.

(21) Appl. No.: 17/882,032

(22) Filed: Aug. 5, 2022

(65) Prior Publication Data

US 2022/0374618 A1    Nov. 24, 2022

Related U.S. Application Data

(63) Continuation of application No. PCT/CN2021/087097, filed on Apr. 14, 2021.

(30) Foreign Application Priority Data

Apr. 30, 2020 (CN) .......................... 202010366967.7

(51) Int. Cl.
*G06F 40/58* (2020.01)
*G06F 21/32* (2013.01)
*G10L 17/14* (2013.01)

(52) U.S. Cl.
CPC .............. *G06F 40/58* (2020.01); *G06F 21/32* (2013.01); *G10L 17/14* (2013.01)

(58) Field of Classification Search
CPC .......... G06F 40/58; G06F 40/44; G06F 40/45; G06F 40/47; G10L 15/00
See application file for complete search history.

(56) References Cited

U.S. PATENT DOCUMENTS 9,101,279 B2 * 8/2015 Ritchey ................... G06F 3/147
9,710,429 B1 * 7/2017 Raghunath .............. G06F 40/00
9,836,458 B1 * 12/2017 Jiang ................... H04L 12/1822
(Continued)

FOREIGN PATENT DOCUMENTS

CN        106682967 A      5/2017
CN        108763231 A      11/2018
(Continued)

OTHER PUBLICATIONS

International Search report issued Jun. 24, 2021 in International Patent Application No. PCT/CN2021/087097.

*Primary Examiner* — Lamont M Spooner (57) ABSTRACT

An interaction information processing method and apparatus, a device, and a medium are provided. The method includes: collecting voice data of at least one participating user in an interaction conducted by users on a real-time interactive interface; determining, based on the voice data, a source language type used by each of the at least one participating user; converting the voice data of the at least one participating user from the source language type to a target language type, to obtain translation data; and displaying the translation data on a target client device.

17 Claims, 3 Drawing Sheets

(56) References Cited

U.S. PATENT DOCUMENTS

| | | | | |
|---|---|---|---|---|
| 9,953,088 B2* | 4/2018 | Gruber | | G06F 16/9535 |
| 2002/0161578 A1* | 10/2002 | Saindon | | G06F 40/58 |
| | | | | 704/235 |
| 2002/0161579 A1* | 10/2002 | Saindon | | G10L 15/26 |
| | | | | 704/235 |
| 2002/0169592 A1* | 11/2002 | Aityan | | G06F 40/58 |
| | | | | 704/2 |
| 2007/0168450 A1* | 7/2007 | Prajapat | | H04L 51/04 |
| | | | | 709/207 |
| 2008/0263132 A1* | 10/2008 | Saintloth | | G06Q 10/107 |
| | | | | 726/11 |
| 2009/0306957 A1* | 12/2009 | Gao | | G06F 40/58 |
| | | | | 704/2 |
| 2010/0135478 A1* | 6/2010 | Wald | | H04M 3/56 |
| | | | | 379/202.01 |
| 2010/0199189 A1* | 8/2010 | Ben-Aroya | | G06F 16/3343 |
| | | | | 709/224 |
| 2010/0293230 A1* | 11/2010 | Lai | | G06F 40/58 |
| | | | | 709/227 |
| 2012/0265518 A1* | 10/2012 | Lauder | | G06F 40/51 |
| | | | | 704/3 |
| 2013/0067307 A1* | 3/2013 | Tian | | G06F 40/58 |
| | | | | 715/222 |
| 2013/0144603 A1* | 6/2013 | Lord | | H04L 67/306 |
| | | | | 704/235 |
| 2013/0238311 A1* | 9/2013 | Lou | | G06F 40/58 |
| | | | | 704/3 |
| 2013/0282421 A1* | 10/2013 | Graff | | G06F 16/9535 |
| | | | | 705/14.27 |
| 2013/0346064 A1* | 12/2013 | Chen | | G06F 40/263 |
| | | | | 704/8 |
| 2014/0035823 A1* | 2/2014 | Khoe | | G06F 3/04886 |
| | | | | 345/171 |
| 2014/0343994 A1* | 11/2014 | Graff | | H04L 51/52 |
| | | | | 705/7.19 |
| 2015/0154183 A1* | 6/2015 | Kristjansson | | H04N 7/15 |
| | | | | 704/E13.001 |
| 2015/0304727 A1* | 10/2015 | Vandichalrajan | | |
| | | | | H04N 21/23614 |
| | | | | 725/40 |
| 2017/0091179 A1* | 3/2017 | Kim | | G06F 40/197 |
| 2018/0013893 A1* | 1/2018 | Cohen | | G06Q 10/02 |
| 2018/0032031 A1* | 2/2018 | Du | | G06T 19/20 |
| 2018/0052831 A1 | 2/2018 | Ahn et al. | | |
| 2018/0165854 A1* | 6/2018 | Du | | G06F 16/00 |
| 2019/0065478 A1* | 2/2019 | Tsujikawa | | G06F 3/167 |
| 2019/0273767 A1* | 9/2019 | Nelson | | H04M 7/0027 |
| 2020/0043481 A1* | 2/2020 | Xiong | | H04L 65/75 |
| 2020/0125643 A1* | 4/2020 | Gutierrez | | H04L 63/083 |
| 2020/0137224 A1* | 4/2020 | Rakshit | | G06F 40/284 |
| 2021/0020161 A1* | 1/2021 | Gao | | G10L 13/08 |
| 2021/0264118 A1* | 8/2021 | Alwell | | G06F 40/58 |
| 2021/0365641 A1* | 11/2021 | Zhang | | G06F 40/58 |
| 2022/0165281 A1* | 5/2022 | Laaksonen | | G10L 19/008 |
| 2022/0245574 A1* | 8/2022 | Cella | | G06Q 10/087 |

FOREIGN PATENT DOCUMENTS

| | | |
|---|---|---|
| CN | 108829688 A | 11/2018 |
| CN | 109688363 A | 4/2019 |
| CN | 110519070 A | 11/2019 |

* cited by examiner

INTERACTION INFORMATION PROCESSING METHOD AND APPARATUS, DEVICE, AND MEDIUM

This application is a continuation of International Application No. PCT/CN2021/087097, filed on Apr. 14, 2021, which claims priority to Chinese Patent Application No. 202010366967.7, titled "INTERACTION INFORMATION PROCESSING METHOD AND APPARATUS, DEVICE AND MEDIUM", filed on Apr. 30, 2020 with the China National Intellectual Property Administration, both of which are incorporated herein by reference in entireties.

FIELD

The present disclosure relates to the technical field of computer data processing, and in particular to a method and apparatus for processing interaction information, a device, and a medium.

BACKGROUND

Nowadays, in real-time interactive application scenarios such as Internet-based multimedia conferences or live video broadcasts, voice information of some users and text information published by all users may be acquired by a server, and the voice information and the text information may be processed, played or displayed.

In actual applications, it is inevitable that users using different languages participate in real-time interaction, which results in a situation where language types used by other participating users are different from a language type used by a current user. Therefore, there may be a situation where the current user cannot understand interactive content of the other participating users when they interact, thus the current user cannot communicate effectively with the other participating users, which greatly reduces the efficiency of user interaction and user experience in the interaction.

SUMMARY

A method and an apparatus for processing interaction information, a device, and a medium are provided according to the embodiments of the present disclosure, in which voice data of other participating users is converted into voice data in a target language type and translation data is obtained, so as to facilitate a user understanding voice information of other participating users based on the translation data, thereby improving the efficiency of information interaction.

In a first aspect, a method for processing interaction information is provided according to an embodiment of the present disclosure. The method includes:
  collecting voice data of at least one participating user in an interaction conducted by users on a real-time interactive interface;
  determining, based on the voice data, a source language type used by each of the at least one participating user;
  converting the voice data of the at least one participating user from the source language type to a target language type, to obtain translation data; and
  displaying the translation data on a target client device.

In a second aspect, an apparatus for processing interaction information is further provided according to an embodiment of the present disclosure. The apparatus includes:
  a voice data collecting module, configured to collect voice data of at least two participating users in an interaction conducted by users on a real-time interactive interface;
  a source language type determining module, configured to determine, based on the voice data, a source language type used by each of the at least two participating users;
  a translation data converting module, configured to convert the voice data of each of the at least two participating users from the source language type to a target language type, to obtain translation data; and
  a translation data display module, configured to display the translation data on a target client device.

In a third aspect, an electronic device is further provided according to an embodiment of the present disclosure. The electronic device includes:
  one or more processors;
  a storage device configured to store one or more programs,
  when the one or more programs are executed by the one or more processors, the one or more processors implement the method for processing interaction information according to any one of the embodiments of the present disclosure.

In a fourth aspect, a storage medium with computer-executable instructions stored thereon is further provided according to an embodiment of the present disclosure. The computer-executable instructions, when being executed by a computer processor, implement the method for processing interaction information according to any one of the embodiments of the present disclosure.

In the technical solution according to the embodiments of the present disclosure, after converting the collected voice data into the voice data in the target language type to obtain the translation data, the translation data can be intuitively displayed on a client for a user to read, which solves the following technical problem: if language types of other participating users are quite different from a language type used by a current user, the current user cannot understand interactive content of the other participating users, therefore the current user cannot communicate effectively with the other participating users and the interaction efficiency is low. The voice data of the other participating users can be converted into the voice data in the target language type, and the translation data is obtained and displayed at the client for the user to read, so that the user can determine the interactive content of the other participating users based on the translation data, thereby improving the efficiency of interactive interaction and user experience.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the original and elements are not necessarily drawn to scale.

DETAILED DESCRIPTION

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

Embodiment 1

Figure 1:
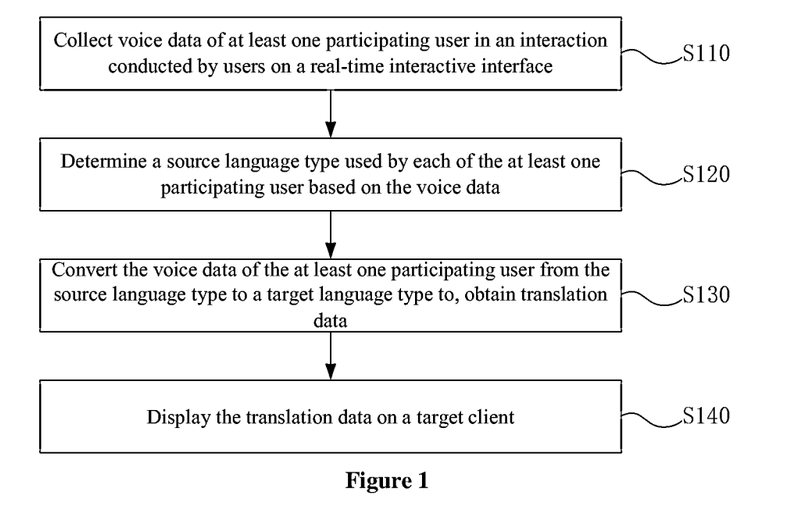
FIG. 1 is a schematic flowchart illustrating a method for processing interaction information according to Embodiment 1 of the present disclosure.

FIG. 1 is a schematic flowchart illustrating a method for processing interaction information according to embodiment 1 of the present disclosure. The embodiment of the present disclosure is applicable for converting interaction voice information of users into interaction voice information in a target language type to obtain translation data in a real-time interactive application scenario supported by the Internet. The method may be performed by an apparatus for processing interaction information. The apparatus for processing interaction information may be implemented in the form of software and/or hardware. Optionally, the apparatus for processing interaction information is implemented by an electronic device, and the electronic device may be a mobile terminal, a Personal Computer (PC) or server, or the like. The real-time interactive application scenario may generally be implemented by a client and a server collectively. The method according to the embodiment may be executed by the client, the server, or both.

As shown in FIG. 1, the method according to the present embodiment includes S110 to S140.

In S110, voice data of at least one participating user is collected in an interaction conducted by users on a real-time interactive interface.

The real-time interactive interface is any interactive interface in a real-time interactive application scenario. The real-time interactive application scenario may be realized through the Internet and computer technology, for example, as an interactive application realized through a native program, a web program or the like. The real-time interactive interface may be an interactive interface during a video conference, an interactive interface during a live video broadcast, and/or a group chat interactive interface. The real-time interactive interface allows multiple users to interact in various interactive behaviors, such as at least one interactive behavior of inputting text, sharing voice, sharing video, or sharing content objects. There may be multiple users participating in the real-time interactive interface to interact with each other, and the users that participate in the real-time interactive interface and interact may be regarded as participating users. When the participating users interact with each other, voice information of each of the participating users may be collected, and the collected voice information may be used as voice data. The voice information of the participating users may refer to the voice information of the participating users generated when the participating users interact through voice, video or other interactive behaviors. In a possible implementation, the participating users may include speaking users, and the speaking users may be the users who participate in the real-time interactive interface and interact by making speech.

When multiple users interact on the real-time interactive interface, each of the participating users may trigger a control for converting voice information, and request information for voice information conversion may be generated and sent to a server by a client. In response to receiving the request information, the server can collect the voice data of the participating users based on the request information. For example, during a video conference, if a participating user A triggers the control for converting voice information, the server can receive request information for voice information conversion, and start collecting the voice data of each of participating users participating in the video conference based on the request information.

In S120, a source language type used by each of the at least one participating user is determined based on the voice data.

The voice data within a preset duration may be collected, and the source language types used by the participating users may be determined based on the voice data within the preset duration. For example, the preset duration may be 1 second to 2 seconds. The source language type may be a language type used by the participating users in the interaction, that is, the language type corresponding to the participating user. The language type corresponding to the voice data, that is, the source language type used by the participating user may be determined by comparing the voice data within the preset duration with data relevant to a preset language type. Optionally, the voice data within one second to two seconds is acquired, and the language type corresponding to the voice data within two seconds is determined by comparing the voice data with the data relevant to the preset language type. The language type determined in this case may be treated as the source language type used by a participating user corresponding to the voice data.

Exemplarily, voice data of four participating users is collected in the interaction on the real-time interactive interface. The four participating users may be marked as a participating user A, a participating user B, a participating user C, and a participating user D respectively. By performing language type determination processing on the voice data of the participating user A, it can be determined that the language type used by the participating user A is Chinese, in this case Chinese can be regarded as the source language type used by the participating user A. By performing language type determination processing on the voice data of the participating user B, it is determined that the language type corresponding to the participating user B is English, and English is the source language type used by the participating user B. The source language type used by each of the participating users may be determined by processing the voice data of the participating users in sequence.

In S130, the voice data of the at least one participating user is converted from the source language type to a target language type, to obtain translation data.

The translation data may be data obtained by translating the voice information. The language type corresponding to the translation data may be regarded as the target language type. For example, if the language type corresponding to the translation data is Chinese, the target language type is Chinese. The target language type corresponds to a target client to which the participating user belongs. The target language type may be determined based on the language type used by a participating user to which a current client belongs. In other words, converting the voice data into the translation data may be implemented by: the language type used by the participating user to which the client belongs is determined, the determined language type is used as the target language type, and the voice data is converted into the translation data with the same language type as the target language type. The translation data may include each of the participating users, voice data associated with the each of the participating users, and translated data corresponding to the voice data.

The target language type of the target terminal to which the participating user belongs may be predetermined. After the voice data is collected, the voice data of the participating user may be translated into the voice data in the target language type to obtain the translation data.

It should be noted that the number of participating users participating in the real-time interaction may be multiple. As long as it is detected that a participating user trigger a control for voice conversion, the server can perform the above steps to determine the target language type used by the participating user who triggers the control for voice conversion, and convert the collected voice data into translation data matching with the target language type. Of course, if the target language type is a lesser-known language and the server cannot provide corresponding translation data, the collected voice data may be converted into a common language type, for example, the collected voice data is converted into translation data of which language type is English.

In S140, the translation data is displayed on a target client.

Each of the clients to which the participating users belong may be used as the target client.

After determining the target language type corresponding to each client, the voice data of other participating users may be converted into the voice data in the target language type to obtain translation data, and the translated data may be displayed on the target client, so that the participating user corresponding to the target client can preview. Since the translation data includes the participating users and translation corresponding to the voice information, speeches and opinions published by other participating users can be quickly understood, thus achieving effective communication and interaction.

Exemplarily, the target language type of the client A to which the participating user A belongs is Chinese. After converting the voice data of the participating users into Chinese, translation data in Chinese may be displayed on a display interface of the client A.

It should be noted that the voice information of the other participating users is processed and displayed only in response to the user triggering the control for voice conversion on the client; if the control for voice conversion is not triggered by the other participating users, the above operations may not be performed.

It should also be noted that once it is detected that the participating user triggers the control for voice conversion, after collecting the voice data, the client converts the voice data into the voice data in the target language type to obtain the translation data, and displays the translation data on the client.

On the basis of the above, the translation data may be displayed in a target area of the client.

The area for displaying the translation data may be preset and the preset display area may be used as the target area. The target area may be, for example, an area at the periphery of a main interaction area, such as at a top, a bottom, a side or the like of the main interaction area. For example, in a video conference scenario, a video interaction window is the main interaction area, which occupies an area of ⅔ of a screen, and an area for displaying the translation data may be the remaining ⅓ area at the side. Accordingly, the remaining ⅓ area at the side is the target area. The translation data may be displayed in the remaining ⅓ area at the side. Certainly, the translation data may be statically displayed or dynamically displayed. Optionally, dynamically displaying the translation data may be implemented as displaying the translation data in the target area in form of bullet screen comments.

In the technical solution according to the embodiments of the present disclosure, after converting the collected voice data into the voice data in the target language type to obtain the translation data, the translation data can be intuitively displayed on a client for a user to read, which solves the following technical problem: if language types of other participating users are quite different from a language type used by a current user, the current user cannot understand interactive content of the other participating users, thus the current user cannot communicate effectively with the other participating users and interaction efficiency is low. The voice data of the other participating users can be converted into the voice data in the target language type, and the translation data is obtained and displayed at the client for the user to read, so that the user can determine the interactive content of the other participating users based on the translation data, thereby improving the efficiency of interactive interaction and user experience.

Embodiment 2

Figure 2:
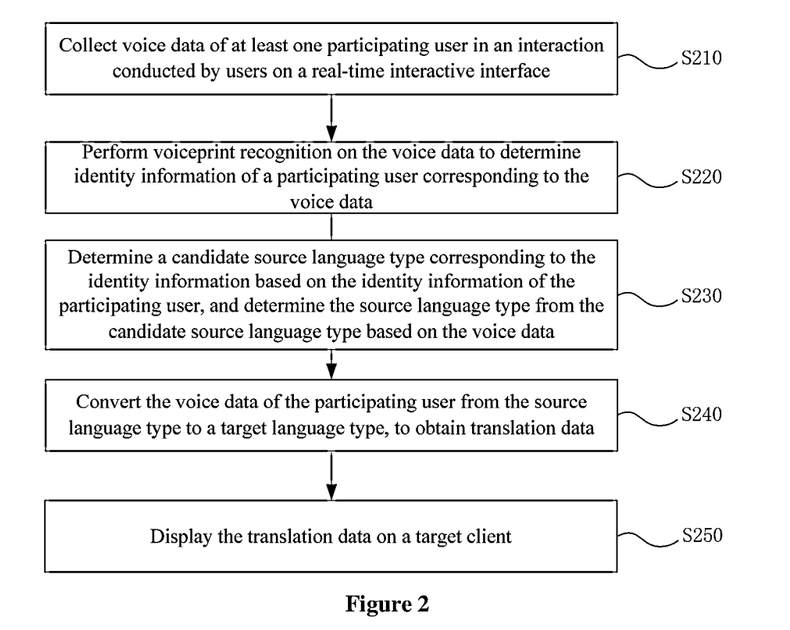
FIG. 2 is a schematic flowchart illustrating a method for processing interaction information according to Embodiment 2 of the present disclosure.

FIG. 2 is a schematic flowchart illustrating a method for processing interaction information according to Embodiment 2 of the present disclosure. On the basis of the foregoing embodiment, before determining the source language type used by each of the participating users based on the voice data, a candidate source language type may be determined based on the voice data of each of the participating users, and the source language type is determined from the candidate source language type, which improves the efficiency of determining the source language type.

As shown in FIG. 2, the method includes S210 to S250.

In S210, voice data of at least one participating user is collected in an interaction conducted by users on a real-time interactive interface.

In S220, voiceprint recognition is performed on the voice data to determine identity information of a participating user, of the at least one participating user, corresponding to the voice data.

The voiceprint recognition is a biometric recognizing technology which is used for recognizing identity based on acoustic characteristics of participating users. Since the voice of each of the participating users has a unique voiceprint, different participating users can be distinguished from each other based on the voiceprint.

After the voice data is collected, acoustic characteristic processing may be performed on the voice data, and the identity information of each of the participating users may be determined through the acoustic characteristic processing, so as to determine based on the identity information whether a source language type corresponding to the identity information is stored in a server.

A client generally has a corresponding client account or client ID so that different clients can be distinguished from each other. However, when multiple users are using one client to participate in the meeting, the multiple users cannot be distinguished through the client ID. In this case, the voiceprint recognition may be further performed on the voice data of each user. Voice of each person has a unique voiceprint, the identity information of the users can be determined accordingly. The identity information may be marked as client ID-user A, client ID-user B, so that different participating users using the same client can be distinguished from each other.

In S230, a candidate source language type corresponding to the identity information is determined based on the identity information of the participating user, and the source language type is determined from the candidate source language type based on the voice data.

It should be noted that while the server performs voiceprint recognition on the voice information to determine the identity information of the user, language type recognition may be performed on the voice data to obtain a current language type corresponding to the participating user, and an identity identifier corresponding to the identity information may be associated with the current language type and stored. When the identity information is determined, the language type associated with the identity information may be retrieved through the identity identifier, and the associated language type may be used as the candidate source language type.

In the interaction conducted by users on the real-time interactive interface, the language types of different participating users may be recorded by the server. The candidate source language type may be the language type which is associated with certain identity information and recorded by the server. For example, a participating user A participates in two real-time interactions. By performing the voiceprint recognition on the voice data collected in the two interactions, the participating user A may be identified; by determining language types of the voice data in the two interactions, it is determined that the language types used by the participating user A in the two interactions are Chinese and English respectively. Language types Chinese and English may be associated with the participating user A, that is, candidate source languages corresponding to the participating user A may be Chinese and English.

Since the language type is mainly determined by comparing two languages, in lack of the candidate source language type, the language type needs to be selected from a large number of language types and matched with the voice data to determine the source language type corresponding to the voice data, which results in not only a large workload but also a low efficiency. By predetermining candidate source language type(s) corresponding to the participating user, the source language type corresponding to the voice data may be determined from the candidate source language type(s), which not only improves the efficiency of determining the source language type, but also saves resources.

It should be noted that determining the language type corresponding to the voice data based on the voice data is mainly implemented by comparing two language types. Therefore, the source language type of the voice data is determined by comparing a large number of language types. In order to improve the efficiency of determining the language type of the voice data, the voiceprint recognition may be performed on the voice data in advance to determine the identity information of a participating user corresponding to the voice data, whether the candidate source language type corresponding to the identity information is stored may be determined, and the source language type is determined from the candidate source language type, which reduces the number of the language types involved in the comparison, thereby improving the efficiency of determining the source language type.

In the present embodiment, the candidate source language type may be determined from the identity information, or may be alternatively determined through a client identifier, for example, an account number. At present, each participating user has an account. Before real-time interaction, it is generally necessary to log in the account to realize the real-time interaction. In the real-time interaction, information associated with each account may be recorded by the server. Optionally, the language type associated with the client is recorded. In this case, when determining the source language type, the candidate source language type associated with the participating user may be determined based on the account logged-in on the client, and the source language type may be determined from the candidate source language type.

In S240, the voice data of the at least one participating user is converted from the source language type to a target language type, to obtain translation data.

In the present embodiment, determining the target language type may include at least one of the following: acquiring a language type preset on the target client as the target language type; or acquiring a login address of the target client, and determining the target language type corresponding to a geographic location of the target client based on the login address.

In other words, determining the target language type may be implemented in at least two ways. The first way may be implemented as: in a possible implementation, when a participating user triggers an operation of the language type conversion, that is, in which language type the translation data is to be displayed, a language type to be converted into may be set, and the set language type may be used as the target language type. Exemplarily, when a participating user triggers a control for language type conversion on the client, a language selection list may be popped up on the client for the participating user to select. The participating user can select any one of the language types. For example, if the user triggers a Chinese language type in the language selection list and clicks a confirmation button, the server or the client may determine that the participating user selects the Chinese language type, and use the Chinese language type as the target language type. In other words, for a current client, the voice information of each of the participating users may be converted into translation data in Chinese and the translation data in Chinese may be displayed on a display interface. In another possible implementation, the user can set the language type on the client in advance, for example, the user sets up the language type when registering. In response to the participating user triggering the control for language type conversion on the client, the client determines the target language type based on the language type set by the user in advance.

The second way may be implemented as: if it is detected that the participating user triggers the control for language conversion, the login address of the client, that is, the IP address of the client, may be acquired, so as to determine, based on the login address, a region where the client resides, and the language type used in the region is used as the target language type. For example, in response to the user triggering the control for language conversion, the login address of the client is acquired. If it is determined based on the login address that the region where the client resides is China, the target language type is Chinese.

In the present embodiment, the target language type corresponding to each of the participating users is determined, and the translation data in the target language type is obtained based on the voice information of other participating users and is displayed on the client. The translation data is more in line with reading habits of the participating users, and the participating users can quickly understand the interaction information of the other participating users, thereby improving the efficiency of interactive interaction.

In S250, the translation data is displayed on the target client.

Optionally, the participating users and the translation data corresponding to the voice data of the participating users are displayed on a display interface of the client in an associated manner.

In other words, after the voice information is converted into the voice information in the target language type, the translation data corresponding to the target language type may be associated with the participating users and pushed to the client, to display the translation data on the client.

In the technical solutions according to the embodiments of the present disclosure, the identity information of the user is determined by performing the voiceprint recognition on the collected voice data, the candidate source language type associated with the identity information is determined, and the source language type is determined from the candidate source language type, which greatly improves the efficiency of determining the source language type.

Embodiment 3

Figure 3:
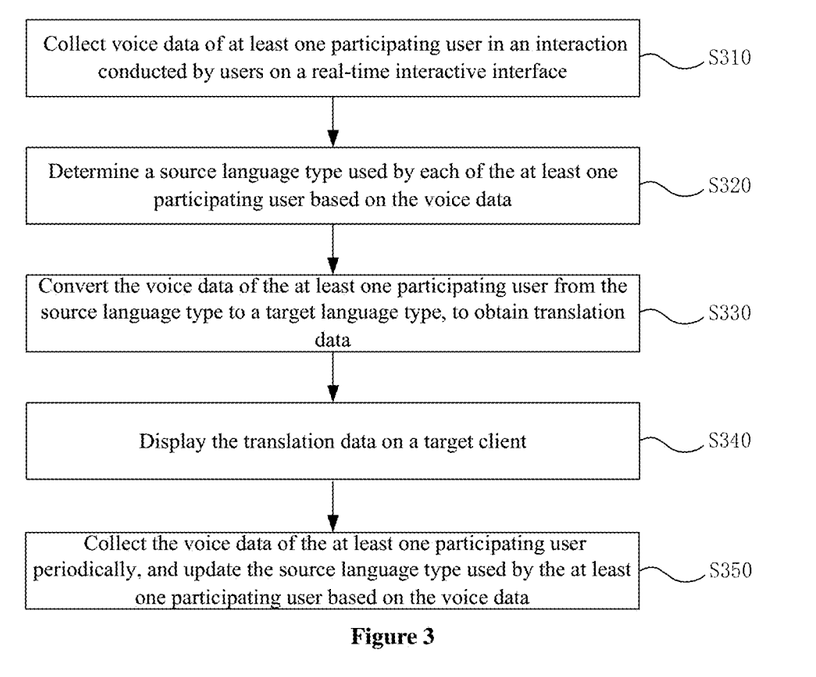
FIG. 3 is a schematic flowchart illustrating a method for processing interaction information according to Embodiment 3 of the present disclosure.

FIG. 3 is a schematic flowchart illustrating a method for processing interaction information according to Embodiment 3 of the present disclosure. On the basis of the foregoing embodiments, it is considered that during the video conference, a source language type corresponding to participating user may change and language type conversion cannot be performed. Voice data of each of the participating users may be collected periodically, and it may be determined, based on the voice data, whether the source language type corresponding to the voice data is changed, and the voice conversion may be performed according to an updated source language type. Of course, whether the target language type set on each client is changed may further be determined, so as to convert the collected voice information into the updated target language type. As shown in FIG. 3, the method includes S310 to S350.

In S310, voice data of at least one participating user is collected in an interaction conducted by users on a real-time interactive interface.

In S320, a source language type used by each of the at least one participating user is determined based on the voice data.

In S330, the voice data of the at least one participating user is converted from the source language type to a target language type, to obtain translation data.

In S340, the translation data is displayed on a target client.

In S350, the voice data of the at least one participating user is collected periodically, and the source language type used by the at least one participating user is updated based on the voice data.

Collecting periodically may be implemented as collecting at a relative time point, for example, an operation for detecting the source language type may be triggered at a predetermined interval. If it is detected that the source language type is changed, the source language type used by the participating user may be updated based on the changed source language type.

Exemplarily, after it is determined that a source language type of the participating user is Chinese, the collected voice data may be processed every ten minutes. If it is determined based on the result of processing that the source language type used by the participating user is English, which indicates that the source language type used by the participating user is changed, English may be used as the source language type used by the participating user, and the voice data of the participating users is converted from English to the target language type.

In practical applications, determining the source language type based on the voice data is mainly implemented as determining the source language type by processing the voice data within one second to two seconds. There may be the case where the source language type used by the participating user is Chinese but English terminologies are included in the interactive content. If the source language type used by the participating user is not changed and the voice data corresponding to the English terminologies is just collected when the voice data is collected periodically, the processing result in this case is that the source language type used by the participating users is English. In order to avoid this situation, optionally, the voice data of the participating user within a preset duration is acquired in response to determining, based on the voice data, that the source language type used by the participating user is changed, and the source language type used by the participating user is updated by the source language type recognized from the voice data within the preset duration.

In other words, if it is determined that the source language type used by the participating user is changed based on the voice data collected periodically, the voice data within the preset duration may be collected. Optionally, the voice data within 5 seconds or 10 seconds may be collected, to further determine, based on the voice data within the preset duration, whether the source language type used by the participating user is changed. If it is determined, based on the voice data within the preset duration, that the source language type used by the participating user is changed, the source language type corresponding to the participating users is updated to the determined source language type.

In the present embodiment, the method further includes: periodically detecting a current target language type of a client, and updating the target language type based on the current target language type in response to the current target language type being different from the target language type determined in advance.

In general, the language type set on the client is the language type expected by the participating user in which the display is performed, that is, the language type of the translation data. By periodically detecting a current target language type of the client, the language type expected by the participating user corresponding to the client for performing the display can be determined in time, so as to convert the voice data of other participating users into the voice data in the target language type and obtain the translation data, which is easy to read by the users.

In the technical solutions of the embodiments of the present disclosure, after determining the source language type used by the participating users and the target language type of the client to which the participating users belongs, the voice data and the target language type set on the client may further be collected periodically. Once the source language type and/or the target language type is changed, the voice data of each of the participating users can be translated in time into translation data corresponding to a updated target language type, so that the user can quickly understand interactive content of the other participating users based on the translation data, thereby improving the efficiency of interactive interaction.

Embodiment 4

Figure 4:
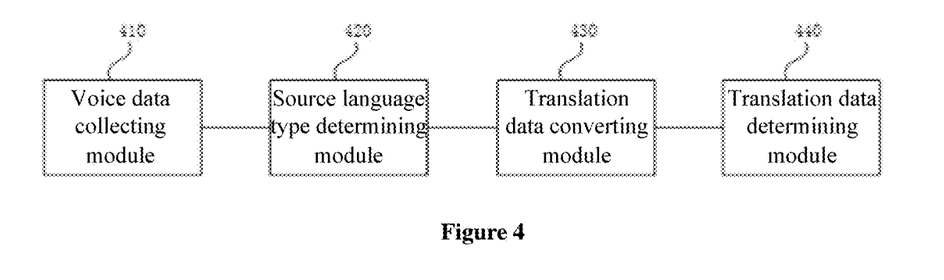
FIG. 4 is a schematic diagram illustrating the structure of an apparatus for processing interaction information according to Embodiment 4 of the present disclosure.

FIG. 4 is a schematic diagram illustrating the structure of an apparatus for processing interaction information according to Embodiment 4 of the present disclosure. As shown in FIG. 4, the apparatus includes: a voice data collecting module 410, a source language type determining module 420, a translation data converting module 430, and a translation data displaying module 440.

The voice data collection module is configured to collect voice data of at least two participating users in an interaction conducted by users on a real-time interactive interface; the source language type determining module is configured to determine a source language type used by each participating user based on the voice data; the translation data converting module is configured to convert the voice data of each participating user from the source language type to a target language type, to obtain translation data; and the translation data display module is configured to display the translation data on a target client.

On the basis of the above technical solution, the source language type determining module further includes:

an identity information recognizing unit, configured to perform voiceprint recognition on the voice data to determine identity information of a participating user corresponding to the voice data; and a candidate source language type determining unit, configured to determine a candidate source language type corresponding to the identity information based on the identity information of the participating user, and determine the source language type from the candidate source language type based on the voice data.

On the basis of the above technical solution, the apparatus further includes a target language type determining module, configured to: acquire a language type set on the target client as the target language type; or acquire a login address of the target client, and determine the target language type corresponding to a geographic location of the target client based on the login address.

On the basis of the above technical solutions, the translation data display module is further configured to display the participating user and the translation data corresponding to the voice data of the participating user in an associated manner on a display interface of the target client.

On the basis of the above technical solutions, the apparatus further includes: a periodical collecting module configured to periodically collect the voice data of the participating user, and update the source language type used by the participating user based on the voice data.

On the basis of the above technical solutions, the periodical collecting module is further configured to: periodically collect the voice data of each participating user; acquire the voice data of the participating user within a preset duration, in response to determining, based on the voice data, that the source language type used by the participating user is changed; and recognize the source language type based on the voice data within the preset duration, to update the source language type used by the participating user.

On the basis of the above technical solutions, the translation data converting module is further configured to translate the voice data of the at least one participating user from the source language type into translation data in multiple languages corresponding to target language types of one or more target clients.

On the basis of the above technical solutions, the real-time interactive interface includes a video conference interactive interface, a live video interactive interface or a group chat interactive interface.

In the technical solution according to the embodiments of the present disclosure, after converting the collected voice data into the voice data in the target language type to obtain the translation data, the translation data can be intuitively displayed on a client for a user to read, which solves the following technical problem: if language types of other participating users are quite different from a language type used by a current user, the current user cannot understand interactive content of the other participating users, therefore the current user cannot communicate effectively with the other participating users and the interaction efficiency is low. The voice data of the other participating users can be converted into the voice data in the target language type, and the translation data is obtained and displayed at the client for the user to read, so that the user can determine the interactive content of the other participating users based on the translation data, thereby improving the efficiency of interactive interaction and user experience.

The apparatus for processing interaction information according to the embodiment of the present disclosure can execute the method for processing interaction information according to any embodiment of the present disclosure, and has functional modules and advantageous effects corresponding to executing the method.

It should be noted that the division of the units and the modules in the above apparatus is merely based on logical functions, and is limited to the above description, as long as the corresponding functions can be realized. In addition, the terms used for identifying the functional units are only to distinguish among the different units, and are not intended to limit the scope of protection of the embodiments of the present disclosure.

Embodiment 5

Hereinafter reference is made to FIG. 5 which shows a schematic structural diagram of an electronic device (for example, the terminal device or server in FIG. 5) 500 suitable for implementing the embodiments of the present disclosure. The terminal device in the embodiments of the present disclosure may include, but not limited to, mobile terminals such as a mobile phone, a notebook computer, a digital broadcast receiver, a personal digital assistance (PDA), a portable android device (PAD), a portable media player (PMP) and a vehicle terminal (such as a vehicle navigation terminal); and fixed terminals such as digital television (TV) and a desktop computer. The electronic device shown in FIG. 5 is exemplary, and is not intended to limit the function and usage scope of the embodiments of the present disclosure.

Figure 5:
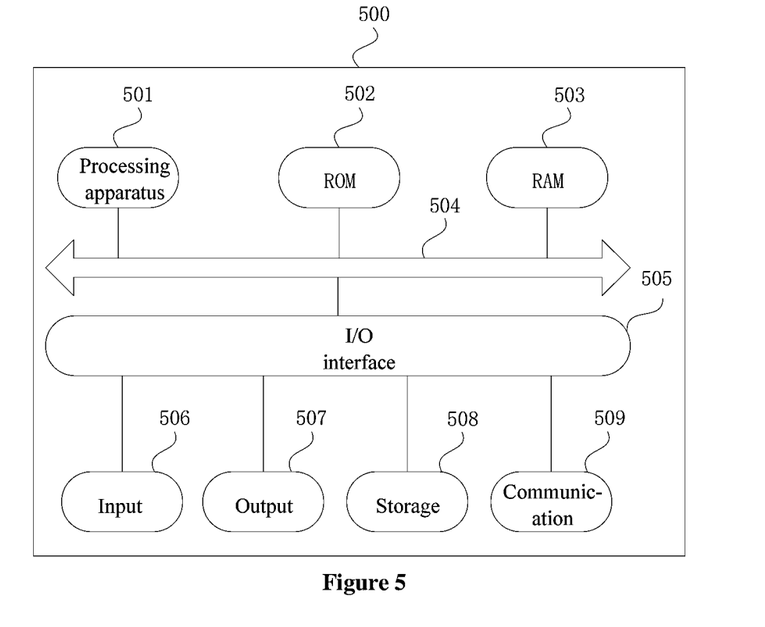
FIG. 5 is a schematic diagram illustrating the structure of an electronic device according to Embodiment 5 of the present disclosure.

As shown in FIG. 5, the electronic device 500 may include a processing apparatus (such as a central processor and a graphic processor) 501. The processing apparatus may perform various appropriate actions and processing based on programs stored in a read-only memory (ROM) 502 or programs uploaded from a storage apparatus 508 to a random access memory (RAM) 503. Various programs and data required for operations of the electronic device 500 are also stored in the RAM 503. The processing apparatus 501, the ROM 502 and the RAM 503 are connected to each other through the bus 504. An input/output (I/O) interface 505 is also connected to the bus 504.

Generally, the following apparatuses may be connected to the I/O interface 505: an input apparatus 506 such as a touch screen, a touch panel, a keyboard, a mouse, a camera, a microphone, an accelerometer, and gyroscope; an output apparatus 507 such as a liquid crystal display (LCD), a loudspeaker and a vibrator; a storage apparatus 508 such as a magnetic tape and a hard disk; and a communication apparatus 509. The communication apparatus 509 may allow the electronic device 500 to communicate with other device in a wired or wireless manner to exchange data. Although FIG. 5 shows the electronic device 500 provided with various apparatuses, it should be understood that not all shown apparatuses are required to be implemented or included. Alternatively, more or less apparatuses may be implemented or included.

According to the embodiments of the present disclosure, a process described with reference to the flowchart above may particularly be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 509, installed from the storage apparatus 508 or installed from the ROM 502. The computer program is executed by the processing apparatus 501 to perform functions defined in the methods described in the embodiments of the present disclosure.

The electronic device according to the embodiment of the present disclosure has a same invention concept as the method for processing interaction information according to the above-mentioned embodiment. For the technical details not described in detail in this embodiment, reference may be made to the above-mentioned embodiment, and the present embodiment has the same advantageous effects as the above-mentioned embodiment.

Embodiment 6

A computer storage medium on which a computer program is stored is provided according to the embodiment of the present disclosure. The program, when being executed by a processor, implements the method for processing interaction information according to the foregoing embodiments.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed in the further, and may connect with digital data communication in any form or carried in any medium (for example, a communication network). Examples of the communication network include a local area network (LAN), a wide area network (WAN), Internet, and an end-to-end network (such as, ad hoc end-to-end network), and any currently known or future developed network.

The computer readable storage medium may be included in the electronic device, or may stand alone without being assembled into the electronic device.

The computer readable medium carries one or more programs. The one or more programs, when executed by the electronic device, enable the electronic device to perform the following operations:

collecting voice data of at least one participating user in an interaction conducted by users on a real-time interactive interface;

determining a source language type used by each of the at least one participating user based on the voice data;

converting the voice data of the at least one participating user from the source language type to a target language type to obtain translation data; and displaying the translation data on a target client.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The units mentioned in the description of the embodiments of the present disclosure may be implemented by means of software or otherwise by means of hardware. A name of the units/modules does not constitute a limitation to the units in some case. For example, a voice data collecting module may be described as "a data collecting module".

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

According to one or more embodiments of the present disclosure, a method for processing interaction information is provided according to Example 1. The method includes:

collecting voice data of at least one participating user in an interaction conducted by users on a real-time interactive interface;

determining a source language type used by each of the at least one participating user based on the voice data;

converting the voice data of the at least one participating user from the source language type to a target language type, to obtain translation data; and displaying the translation data on a target client.

According to one or more embodiments of the present disclosure, a method for processing interaction information is provided according to Example 2. The method further includes:

optionally, before determining a source language type used by each of the at least one participating user based on the voice data, the method further includes:

performing voiceprint recognition on the voice data to determine identity information of a participating user, of the at least one participating user, corresponding to the voice data; and determining, based on the identity information of the participating user, a candidate source language type corresponding to the identity information, and determining the source language type from the candidate source language type based on the voice data.

According to one or more embodiments of the present disclosure, a method for processing interaction information is provided according to Example 3. The method further includes:

optionally, determining the target language type includes at least one of the following: acquiring a language type set on the target client as the target language type; or acquiring a login address of the target client, and determining the target language type corresponding to a geographic location of the target client based on the login address.

According to one or more embodiments of the present disclosure, a method for processing interaction information is provided according to Example 4. The method further includes:

optionally, the displaying the translation data on a target client includes:

displaying the at least one participating user and the translation data corresponding to the voice data of the at least one participating user in an associated manner on a display interface of the target client.

According to one or more embodiments of the present disclosure, a method for processing interaction information is provided according to Example 5. The method further includes:

optionally, periodically collecting the voice data of the at least one participating user, and updating the source language type used by the at least one participating user based on the voice data.

According to one or more embodiments of the present disclosure, a method for processing interaction information is provided according to Example 6. The method further includes:
  optionally, the periodically collecting the voice data of the at least one participating user, and updating the source language type used by the at least one participating user based on the voice data, includes:
  collecting periodically the voice data of each of the at least one participating user, and acquiring, in response to determining based on the voice data that the source language type used by the participating user is changed, the voice data of the participating user within a preset duration; and
  recognizing the source language type based on the voice data within the preset duration, to update the source language type used by the participating user.

According to one or more embodiments of the present disclosure, a method for processing interaction information is provided according to Example 7. The method further includes:
  optionally, periodically detecting a current target language type of a client, and updating the target language type based on the current target language type in response to the current target language type being different from the target language type.

According to one or more embodiments of the present disclosure, a method for processing interaction information is provided according to Example 8. The method further includes:
  optionally, the converting the voice data of the at least one participating user from the source language type to a target language type, to obtain translation data, includes:
  translating the voice data of the at least one participating user from the source language type into translation data in multiple languages corresponding to target language types of one or more target clients.

According to one or more embodiments of the present disclosure, a method for processing interaction information is provided according to Example 9. The method further includes:
  optionally, the real-time interactive interface includes a video conference interactive interface, a live video interactive interface or a group chat interactive interface According to one or more embodiments of the present disclosure, a method for processing interaction information is provided according to Example 10. The method further includes:
  optionally, the at least one participating user includes at least one speaking user.

According to one or more embodiments of the present disclosure, an apparatus for processing interaction information is provided according to Example 11. The apparatus includes:
  a voice data collecting module, configured to collect voice data of at least two participating users in an interaction conducted by users on a real-time interactive interface;
  a source language type determining module, configured to determine a source language type used by each of the at least two participating users based on the voice data;
  a translation data converting module, configured to convert the voice data of each of the at least two participating users from the source language type to a target language type, to obtain translation data; and
  a translation data display module, configured to display the translation data on a target client.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and acts described above are merely example forms of implementing the claims.

The invention claimed is:

1. A method for processing interaction information, comprising:
  in response to receiving a request, collecting voice data of at least one participating user in an interaction conducted by users on a real-time interactive interface, wherein the request is generated in response to a user triggering a control for voice conversion;
  determining a source language type of the voice data;
  converting the voice data of the at least one participating user from the source language type to a target language type, to obtain translation data; and
  displaying the translation data on a target client device, the method further comprising:
  periodically determining whether the source language type of the voice data is changed, based on collected voice data lasting for a first time duration;
  in response to determining, based on the voice data lasting for the first time duration, that the source language type of the voice data is changed, collecting additional voice data lasting for a second time duration, wherein the second time duration is longer than the first time duration; and
  determining the source language type of the voice data based on the additional voice data lasting for the second time duration.

2. The method according to claim 1, wherein before determining the source language type of the voice data, the method further comprises:
  performing voiceprint recognition on the voice data to determine the identity information of the at least one participating user, corresponding to the voice data.

3. The method according to claim 1, wherein determining the target language type comprises at least one of the following:
acquiring a language type set on the target client device as the target language type; or
acquiring a login address of the target client device, and determining the target language type corresponding to a geographic location of the target client device based on the login address.

4. The method according to claim 1, wherein the displaying the translation data on a target client device comprises:
displaying the at least one participating user and the translation data corresponding to the voice data of the at least one participating user in an associated manner on a display interface of the target client device.

5. The method according to claim 1, further comprising:
detecting a current target language type of a client device periodically, and updating the target language type based on the current target language type in response to the current target language type being different from the target language type.

6. The method according to claim 1, wherein the converting the voice data of the at least one participating user from the source language type to a target language type, to obtain translation data, comprises:
translating the voice data of the at least one participating user from the source language type into translation data in multiple languages corresponding to target language types of one or more target client devices.

7. The method according to claim 1, wherein the real-time interactive interface comprises a video conference interactive interface, a live video interactive interface or a group chat interactive interface.

8. The method according to claim 1, wherein the at least one participating user comprises at least one speaking user.

9. The method according to claim 1, further comprising:
in response to determining incapability of providing translation data corresponding to the target language type, translating the voice data of the at least one participating user into a preset language type.

10. An apparatus for processing interaction information, comprising:
one or more processors;
a storage device configured to store one or more programs, wherein
when the one or more programs are executed by the one or more processors, cause the one or more processors to:
in response to receiving a request, collect voice data of at least two participating users in an interaction conducted by users on a real-time interactive interface, wherein the request is generated in response to a user triggering a control for voice conversion;
determine a source language type of the voice data;
convert the voice data of each of the at least two participating users from the source language type to a target language type, to obtain translation data; and
display the translation data on a target client device, wherein the processor is further configured for:
periodically determining whether the source language type of the voice data is changed, based on collected voice data lasting for a first time duration;
in response to determining, based on the voice data lasting for the first time duration, that the source language type of the voice data is changed, collecting additional voice data lasting for a second time duration, wherein the second time duration is longer than the first time duration; and
determining the source language type of the voice data based on the additional voice data lasting for the second time duration.

11. The apparatus according to claim 10, wherein when the one or more programs are executed by the one or more processors, further cause the one or more processors to:
perform voiceprint recognition on the voice data to determine identity information of a participating user, of the at least two participating users, corresponding to the voice data.

12. The apparatus according to claim 10, wherein when the one or more programs are executed by the one or more processors, further cause the one or more processors to:
acquire a language type set on the target client device as the target language type; or
acquire a login address of the target client device, and determine the target language type corresponding to a geographic location of the target client device based on the login address.

13. The apparatus according to claim 10, wherein when the one or more programs are executed by the one or more processors, further cause the one or more processors to:
display the participating users and the translation data corresponding to the voice data of the participating users in an associated manner on a display interface of the target client device.

14. The apparatus according to claim 10, wherein when the one or more programs are executed by the one or more processors, further cause the one or more processors to:
detect a current target language type of a client device periodically, and update the target language type based on the current target language type in response to the current target language type being different from the target language type.

15. The apparatus according to claim 10, wherein when the one or more programs are executed by the one or more processors, further cause the one or more processors to:
translate the voice data of the participating user from the source language type into translation data in multiple languages corresponding to target language types of one or more target client devices.

16. The apparatus according to claim 10, wherein the real-time interactive interface comprises a video conference interactive interface, a live video interactive interface or a group chat interactive interface.

17. A non-transitory storage medium having computer-executable instructions stored thereon, wherein the computer-executable instructions, when being executed by a computer processor, implement:
in response to receiving a request, collecting voice data of at least one participating user in an interaction conducted by users on a real-time interactive interface, wherein the request is generated in response to a user triggering a control for voice conversion;
determining a source language type of the voice data;
converting the voice data of the at least one participating user from the source language type to a target language type, to obtain translation data; and
displaying the translation data on a target client device, wherein the computer-executable instructions, when being executed by a computer processor, further implement:

periodically determining whether the source language type of the voice data is changed, based on collected voice data lasting for a first time duration;

in response to determining, based on the voice data lasting for the first time duration, that the source language type of the voice data is changed, collecting additional voice data lasting for a second time duration, wherein the second time duration is longer than the first time duration; and determining the source language type of the voice data based on the additional voice data lasting for the second time duration.

\* \* \* \* \*